(12) United States Patent
Takedomi et al.

(10) Patent No.: US 10,025,117 B2
(45) Date of Patent: Jul. 17, 2018

(54) FUNCTIONAL DYED SPECTACLE LENS

(71) Applicant: NIKON-ESSILOR CO., LTD., Tokyo (JP)

(72) Inventors: Yuka Takedomi, Tokyo (JP); Yuko Kawamura, Tokyo (JP)

(73) Assignee: NIKON-ESSILOR CO., LTD., Tokyo (JP)

(*) Notice: Subject to any disclaimer, the term of this patent is extended or adjusted under 35 U.S.C. 154(b) by 0 days.

(21) Appl. No.: 15/153,094

(22) PCT Filed: Oct. 30, 2014

(86) PCT No.: PCT/JP2014/078876
§ 371 (c)(1),
(2) Date: May 12, 2016

(87) PCT Pub. No.: WO2015/072336
PCT Pub. Date: May 21, 2015

(65) Prior Publication Data
US 2016/0313574 A1  Oct. 27, 2016

(30) Foreign Application Priority Data

Nov. 12, 2013  (JP) .................................. 2013-234224

(51) Int. Cl.
*G02C 3/00*      (2006.01)
*G02C 7/02*      (2006.01)
(Continued)

(52) U.S. Cl.
CPC ........ *G02C 7/104* (2013.01); *B29D 11/00923* (2013.01); *G02B 5/223* (2013.01);
(Continued)

(58) Field of Classification Search
CPC .... B29D 11/00923; G02B 5/223; G02C 7/10; G02C 7/104; G02C 7/108; G02C 2202/10
(Continued)

(56) References Cited

U.S. PATENT DOCUMENTS 5,135,298 A * 8/1992 Feltman .................. G02C 7/12
351/159.61
6,411,444 B1 * 6/2002 Moskovich .............. G02B 5/22
359/722

(Continued)

FOREIGN PATENT DOCUMENTS

JP    2003-248202    9/2003
JP    2009-540393    11/2009
(Continued)

OTHER PUBLICATIONS

International Preliminary Report on Patentability, in corresponding International Application No. PCT/JP2014/078876, dated May 17, 2016.
(Continued)

*Primary Examiner* — Tuyen Tra
(74) *Attorney, Agent, or Firm* — Finnegan, Henderson, Farabow, Garrett, Dunner, LLP (57) ABSTRACT

A functional dyed lens for spectacles is obtained by dyeing at least one of the surfaces of an undyed plastic lens, and in the functional dyed lens, a dyeing density defined as a difference in luminous transmittance from the undyed plastic lens is 2% or more but 4% or less, and a difference in average transmittance from the undyed plastic lens in a wavelength region of 530 nm to 570 nm is 3% or more but 5% or less.

6 Claims, 4 Drawing Sheets

(51) Int. Cl.
*G02C 7/10* (2006.01)
*G02B 5/22* (2006.01)
*B29D 11/00* (2006.01)

(52) U.S. Cl.
CPC .............. *G02C 7/10* (2013.01); *G02C 7/108* (2013.01); *G02C 2202/10* (2013.01)

(58) Field of Classification Search
USPC ...................... 351/159.65, 159.6, 159.01, 41
See application file for complete search history.

(56) References Cited

U.S. PATENT DOCUMENTS

| | | | |
|---|---|---|---|
| 7,922,324 B2 * | 4/2011 | Ishibashi | A61F 9/022 351/159.63 |
| 2007/0171537 A1 | 7/2007 | Fung | |
| 2008/0094566 A1 | 4/2008 | Ishak et al. | |
| 2011/0075096 A1 | 3/2011 | Ishak et al. | |

FOREIGN PATENT DOCUMENTS

| | | |
|---|---|---|
| JP | 2013-54275 | 3/2013 |
| JP | 2013-61653 | 4/2013 |
| WO | WO 2007/146933 A2 | 12/2007 |

OTHER PUBLICATIONS

Written Opinion of the international Searching Authority; in corresponding International Application No. PCT/JP2014/078876, dated Feb. 3, 2015.
International Search Report from the Japanese Patent Office for International Application No, PCT/JP2014/078876, dated Feb. 3, 2015.
Office Action issued by the Japanese Patent Office dated Apr. 4, 2017 in corresponding Japanese Application No. 2015-547727, and English translation thereof.
Extended European Search Report issued in European Application No. 14862711.0, dated Apr. 10, 2017 (7 pages).

* cited by examiner

FUNCTIONAL DYED SPECTACLE LENS

CROSS REFERENCE TO RELATED APPLICATIONS

This application is a continuation application of International Application No. PCT/JP2014/078876 filed on Oct. 30, 2014, which claims priority under 35 U.S.C. 119(a) to Application No, 2013-234224 filed in Japan on Nov. 12, 2013, all of which are hereby expressly incorporated by reference into the present application.

BACKGROUND OF THE INVENTION

The present invention relates to a functional dyed lens for spectacles.

BACKGROUND ART

In recent years, plastic lenses are very often used in place of glass lenses based on advantages including lightness in weight, excellent impact resistance and ease of dyeing. In particular, plastic lenses for spectacles are frequently subjected to uniform dyeing of the whole to a desired color or dyeing with a density gradient (gradation dyeing) for purposes such as a cosmetic effect, eye protection and a light shielding effect.

Moreover, in recent years, functional dyed lenses for spectacles having not only the cosmetic effect but also specific functions imparted by dyeing have been proposed (see Patent Literatures 1 and 2) and actively put on the market.

In particular, a lens which effectively cuts high energy blue light (380 nm to 500 nm) in the visible light is a main type of functional dyed lens for spectacles because it is effective in increasing the contrast while reducing eye strain.

Commonly assigned JP 2013-054275 A discloses a dyed lens which has excellent light absorption performance at short wavelengths of 380 nm to 450 nm and is obtained by dyeing with the use of a specific compound capable of effectively cutting only light at the short wavelengths of 380 nm to 450 nm.

JP 2013-061653 A discloses a plastic lens for spectacles which contains an organic dye having a main absorption real at 565 nm to 605 nm in order to impart an anti-glare function for alleviating discomfort associated with glare caused by visible light, unclearness in contrast, ocular fatigue and the like.

The spectacle lens disclosed in JP 2013-061653 A considerably decreases in transmittance at the main absorption peak wavelength ranging from 565 nm to 605 nm, and even the spectacle lenses disclosed in Examples and the like have a luminous transmittance Y of 14.1% to 73.4% and the luminous transmittance decreases considerably.

Therefore, the spectacle lens disclosed in JP 2013-061653 A has a wavelength-selectively sharp light absorption peak at around 585 nm and hence can have excellent anti-glare performance and a contrast-enhancing effect, and as a result achieves good optical transparency at wavelengths other than around 585 nm owing to sharpness at the specific absorption peak and can ensure a bright field. Accordingly, an extremely good balance is struck between the anti-glare properties and visibility and toning is easily performed to have various colors such as gray and brown.

SUMMARY

Figure 5:
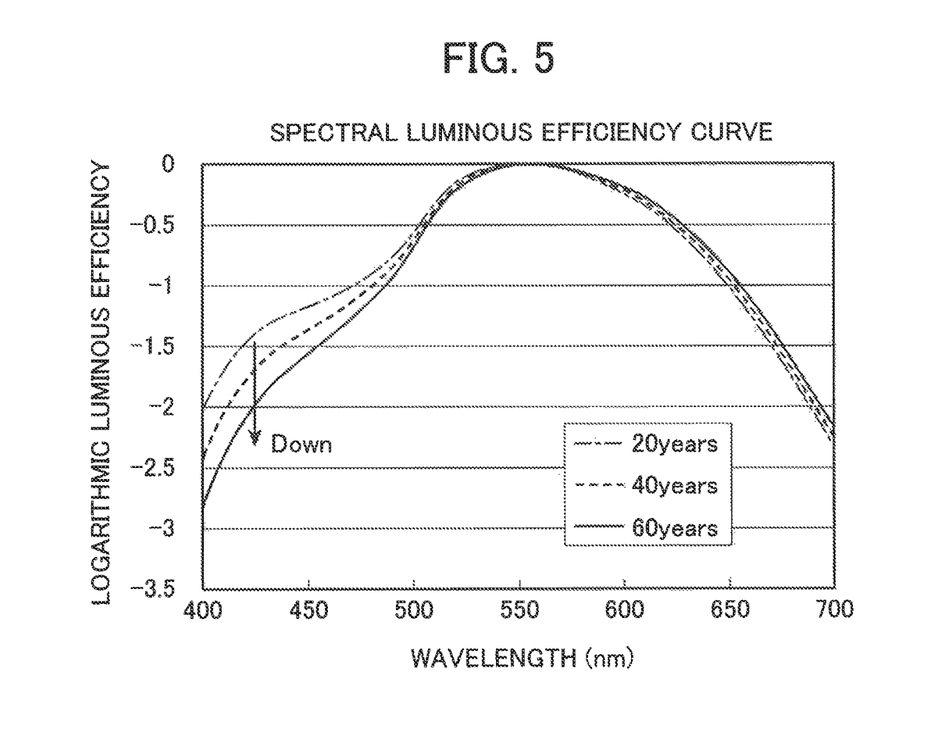
FIG. 5 is a graph illustrating spectral luminous efficiency curves of human eyes as indicated by logarithmic luminous efficiency with respect to wavelength.

However, human crystalline lenses are generally known to get colored yellow with aging. Therefore, as is clear from spectral luminous efficiency curves illustrated in FIG. 5, the luminous efficiency of human eyes decreases with aging in a blue light wavelength region of 380 nm to 500 nm.

Accordingly, middle-aged and elderly people, for example, those of 40 years old or above intrinsically cut blue light in the short wavelength region with their crystalline lenses getting colored yellow. Therefore, there was a problem that even when such middle-aged and elderly people use the spectacle lens as disclosed in JP 2013-054275 A in which blue light is effectively cut as a main type of functional dyed lens for spectacles, the use of the functional dyed lens for spectacles is expected to be less effective than in young people.

There was also a problem that middle-aged and elderly people are not expected to perceive white, particularly white of a screen on a personal computer (PC) as clear white because their crystalline lenses get colored yellow.

Figure 6:
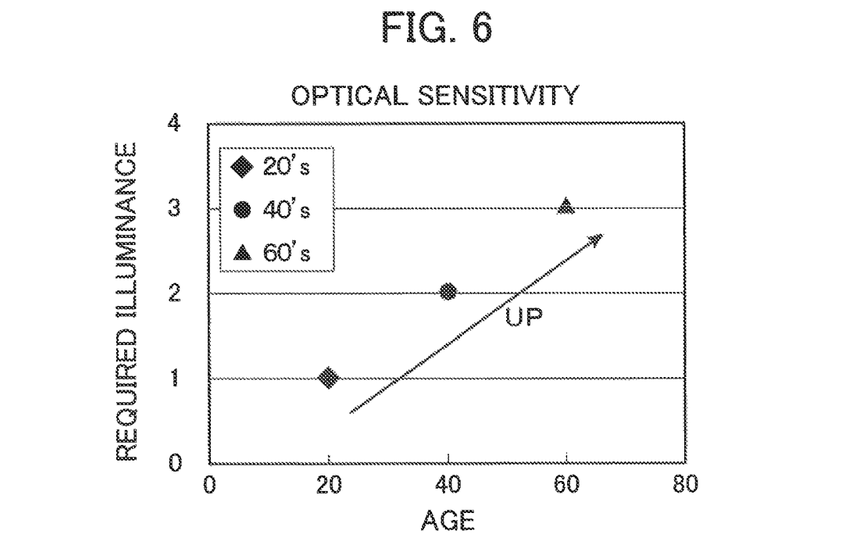
FIG. 6 is an illustration diagram illustrating optical luminous efficiency of human eyes as indicated by required illuminance with respect to human age.
Figure 7:
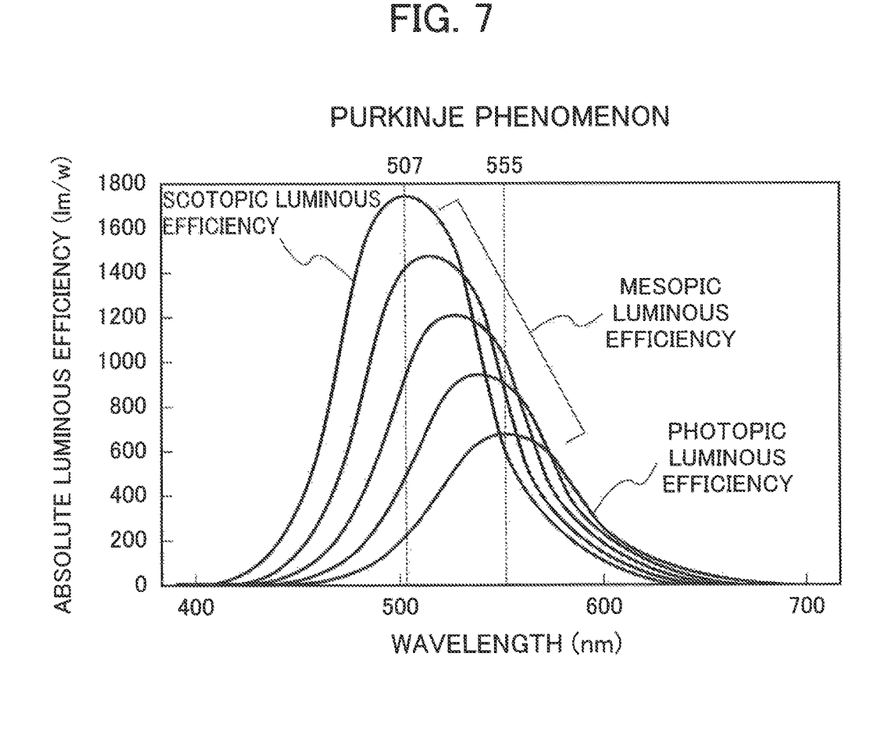
FIG. 7 is an illustration diagram illustrating Purkinje phenomenon of human eyes as indicated by absolute luminous efficiency with respect to wavelength.

In addition, as illustrated in FIG. 6, as is generally said, human eyes decrease in optical sensitivity and increase in required illuminance with aging. On the other hand, as illustrated in FIG. 7, a phenomenon that even if human eyes perceive red and blue at the same brightness in a bright place, red is perceived to be dustier and darker in a gloomy place is known as Purkinje phenomenon.

Therefore, there was a problem that middle-aged and elderly people, for example, those of 40 years old or above see objects in a gloomy place less brightly than young people, and particularly vividness of red is lost and red is perceived to be dustier and darker.

The plastic lens for spectacles disclosed in JP 2013-061653 A has a considerably low luminous transmittance and hence can exhibit an anti-glare effect and other effects when used in an extremely bright, environment of high illuminance. However, habitual use was not assumed and there was a problem that, when middle-aged and elderly people who require higher levels of illuminance wear the spectacles habitually, they have difficulty seeing and objects cannot be seen brightly in a gloomy place, and particularly vividness of red is further lost and red is perceived to be further dustier and darker.

The present invention has been made in view of the above situation and an object of the present invention is to provide a functional dyed lens for spectacles suitable to the eyes of middle-aged and elderly people.

To be more specific, an object of the present invention is to solve the foregoing problems associated with the conventional techniques and to provide a functional dyed lens for spectacles that allows middle-aged and elderly people wearing the spectacles to see objects brightly and vividly even in a gloomy place and particularly to perceive red brightly without losing its vividness, and also allows the middle-aged and elderly people to perceive white, for example, a white screen on a personal computer (particularly an LED backlight) to be whiter and as a result to more comfortably perform operations in which their eyes are to be fixed on white, for example, operations on a personal computer.

Solution to Problem

In order to achieve the above object, the inventors of the present invention have made an intensive study and as a result found that a functional dyed lens for spectacles which is suitable to the eyes of middle-aged and elderly people and which allows the middle-aged and elderly people to see objects brightly and vividly even in a gloomy place and to perceive white of a white screen on a personal computer to be whiter can be obtained by slightly dyeing an uncolored and undyed plastic lens to such an extent that coloring is not noticed to thereby reduce the average transmittance after dyeing by a predetermined few percent from the average transmittance of the undyed plastic lens in a wavelength region of 530 nm to 570 nm while also specifying the dyeing density defined as a difference between the luminous transmittance of the undyed plastic lens and that of the dyed plastic lens within a predetermined range. The prevent invention has been thus completed.

More specifically, the present invention provides a functional dyed lens for spectacles obtained by dyeing a lens base, wherein a dyeing density defined, as a difference in luminous transmittance from an undyed plastic lens formed of the lens base is 2% or more but 4% or less, and wherein a difference in average transmittance from the undyed plastic lens in a wavelength region of 530 nm to 570 nm is 3% or more but 5% or less.

A difference in average transmittance from the undyed plastic lens in a wavelength region of 430 nm to 470 nm is preferably 2% or less.

A difference in average transmittance from the undyed plastic lens in a wavelength region of 630 nm to 670 nm is preferably 3.5% or less.

At least one surface of the lens, base is preferably dyed.

The undyed plastic lens preferably has a luminous transmittance in terms of 2 mm thickness of 94.5 to 99.9%.

The undyed plastic lens preferably has an average transmittance in terms of 2 mm thickness of 94.5 to 99.9% in the wavelength region of 530 nm to 570 nm.

The undyed plastic lens preferably has an average transmittance in terms of 2 mm thickness of 94.5 to 99.9% in a wavelength region of 430 nm to 470 nm.

The undyed plastic lens preferably has an average transmittance in terms of 2 mm thickness of 97.0 to 99.9% in a wavelength region of 630 nm to 670 nm.

The present invention is configured as described above and therefore can provide a functional dyed lens for spectacles which is suitable to the eyes of middle-aged and elderly people.

Further, according to the invention which is configured as described above, the functional dyed lens for spectacles allows middle-aged and elderly people wearing the spectacles to see objects brightly and vividly even in a gloomy place and particularly to perceive red brightly without losing its vividness, and also allows the middle-aged and elderly people to perceive white, for example, a white screen on a personal computer (particularly an LED backlight) to be whiter and as a result to more comfortably perform operations in which their eyes are to be fixed on white, for example, operations on a personal computer.

DETAILED DESCRIPTION OF THE INVENTION

A functional dyed lens for spectacles according to the present invention is described below in detail based on embodiments shown in the accompanying drawings.

The embodiments illustrated below serve to specifically illustrate the invention so that the scope of the invention can be further understood, and the invention should not be construed as being limited to these embodiments unless otherwise specified.

Figure 1:
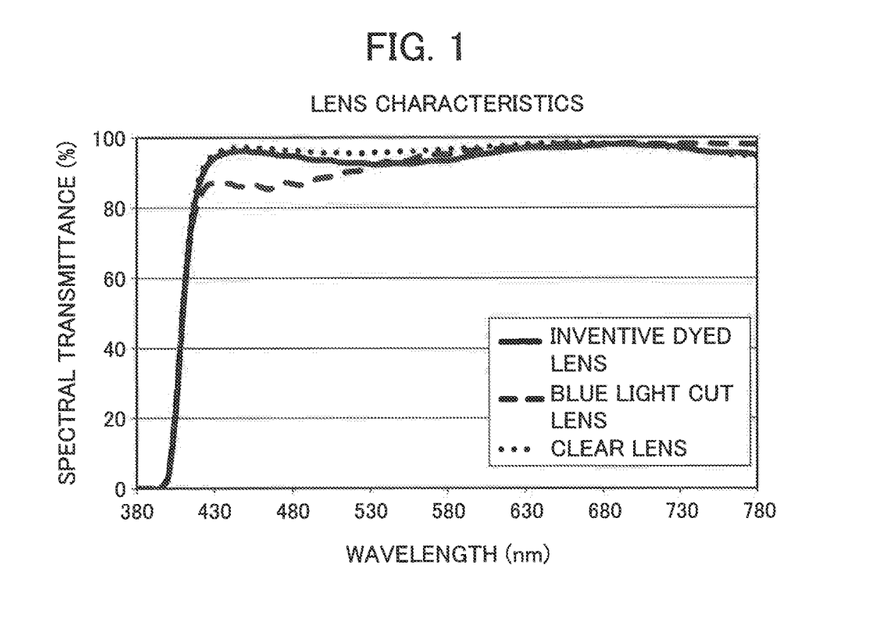
FIG. 1 is a graph illustrating lens characteristics of an exemplary functional dyed lens for spectacles according to the invention, an exemplary undyed plastic (clear) lens and an exemplary conventional blue light cut lens.

Lens characteristics of an exemplary functional dyed lens for spectacles according to the invention which are expressed by a spectral transmittance curve in the visible reason are illustrated in FIG. 1.

In addition to the lens characteristics of the exemplary functional dyed lens for spectacles according to the invention, lens characteristics of an undyed plastic lens (clear lens) and a conventional blue light cut lens are also illustrated in FIG. 1 for the purpose of reference.

As illustrated in. FIG. 1, the exemplary functional dyed lens for spectacles (hereinafter referred to simply as "dyed lens") according to the invention is obtained by dyeing a plastic base serving as a lens base, preferably at least one surface of the plastic base with a predetermined dyeing solution. The lens base as used herein can be regarded as an undyed plastic lens (hereinafter referred to as "clear lens") when dyeing with the dyeing solution is not performed.

In the exemplary dyed lens of the invention indicated by a solid line spectral transmittance curve in FIG. 1, with respect to the clear lens indicated by a dotted line spectral transmittance curve in FIG. 1, the spectral transmittance in a wavelength region of 530 nm to 570 nm is reduced so that the average transmittance in this wavelength region is reduced by a value within a predetermined limited range (3% or more but 5% or less), in other words, the difference in the average transmittance is set within the predetermined limited range, and at the same time, the transmittance is slightly reduced over the whole of the visible region, particularly at around 430 nm to 670 nm so that the luminous transmittance τv is reduced by a value within a predetermined limited range (2% or more but 4% or less), in other words, the difference in the luminous transmittance τv is set within the predetermined limited range.

According to the embodiment of the invention, a difference between the luminous transmittance $\tau v0$ of the clear lens and the luminous transmittance $\tau v$ of the dyed plastic lens, i.e., the functional dyed lens for spectacles is referred to as "dyeing density $\Delta\tau$," In other words, the dyeing density $\Delta\tau$ is defined as an amount of luminous transmittance reduced by dyeing and is given by expression (1) shown below. Therefore, according to the embodiment of the invention, the dyeing density $\Delta\tau$ is set within the above predetermined limited range.

$$\Delta\tau = \tau v0 - \tau v \qquad (1)$$

As a result, as compared to the clear lens, the exemplary functional dyed lens for spectacles according to the invention allows middle-aged and elderly people wearing the spectacles to see objects brightly and vividly even in a gloomy place and particularly to perceive red brightly without losing its vividness, and also allows the middle-aged and elderly people to perceive white, for example, a white screen on a personal computer (particularly an LED backlight) to be whiter and as a result to more comfortably perform operations in which their eyes are to be fixed on white, for example, operations on a personal computer.

As described above, the exemplary dyed lens according to the invention has a dyeing density limited to a range of 2% or more but 4% or less.

According to the embodiment of the invention, the dyeing density is limited to the range of 2% or more but 4% or less because a dyeing density of less than 2% may cause a problem that the density is too low to enable a person wearing the spectacles to easily feel the effect of the invention, whereas at a dyeing density exceeding 4%, the luminous transmittance is reduced too much and the person wearing the spectacles perceives the darkness or perceives a dyed color intensely to have an uncomfortable feeling.

According to the exemplary dyed lens of the invention, as described above, the difference between the average transmittance of the clear lens and that of the exemplary dyed lens according to the invention in the wavelength region of 530 nm to 570 nm is limited to the range of 3% or more but 5% or less.

According to the embodiment of the invention, the average transmittance difference is limited to the range of 3% or more but 5% or less because an average transmittance difference of less than 3% may cause a problem that the density is too low to enable a person wearing the spectacles to easily feel the effect of the invention, whereas at an average transmittance difference exceeding 5%, the luminous transmittance is reduced too much and the person wearing, the spectacles perceives the darkness or perceives a dyed color intensely to have an uncomfortable feeling.

According to the exemplary dyed lens of the invention, in addition to the above limitation, a difference in average transmittance from the clear lens in a wavelength region of 430 nm to 470 nm is more preferably 2% or less.

The difference between the average transmittance of the clear lens and that of the exemplary dyed lens according to the invention in this wavelength region is preferably limited to the range of 2% or less because when the average transmittance difference exceeds 2%, a yellowish tint is perceived comparatively intensely and the person wearing the spectacles do not easily feel the effect of the invention.

According to the exemplary dyed lens of the invention, in addition to the above limitation, a difference in average transmittance from the clear lens in a wavelength region of 630 nm to 670 nm is more preferably 3.5% or less.

The difference between the average transmittance of the clear lens and that of the exemplary dyed lens according to the invention in this wavelength region is preferably limited to the range of 3.5% or less because when the average transmittance difference exceeds 3.5%, a bluish tint is perceived and the decrease in luminous transmittance makes it hard for the person wearing the spectacles to feel the effect of the invention.

On the other hand, in the conventional blue light cut lens disclosed in JP 2013-054275 A as indicated by a broken line spectral transmittance curve in FIG. 1, in a wavelength range of 380 nm to 450 nm, the spectral transmittance significantly decreases as compared to the exemplary dyed lens according to the invention and the clear lens, but in a wavelength range of 530 nm to 570 nm, the spectral transmittance decreases as compared to the clear lens but does not sufficiently decrease unlike that of the exemplary dyed lens of the invention and does not satisfy the above limited range of the invention, and increases contrary to the clear lens in a wavelength range of 670 nm to 780 nm. Therefore, when used by middle-aged and elderly people, the conventional blue light cut lens cannot achieve an improvement of red vividness or an improvement of perception of white.

The plastic base which is a lens base before dyeing to be used in the embodiment of the invention is formed of, for example, transparent plastics such as acrylic resin, thiourethane resin, methacrylic resin, allyl resin, episulfide resin, polycarbonate resin, polyurethane resin, polyester resin, polystyrene resin, polyethersulfone resin, poly-4-methylpentene-1 resin, diethylene glycol bis(allyl carbonate) resin (CR-39), polyvinyl chloride resin, allyl diglycol carbonate resin, halogen-containing copolymer, and sulfur-containing copolymer.

According to this embodiment, for example, a refractive index selected from 1.50, 1.55, 1.60, 1.67, 1.70 and 1.74 is used as the refractive index (ne) of the base. When the refractive of the plastic base plastic is set to 1.60 or more, allyl carbonate resin, acrylate resin, methacrylate resin and thiourethane resin, episulfide resin and the like are preferably used for the plastic base.

The plastic base before dyeing to be used in the embodiment of the invention makes up the clear lens.

The luminous transmittance of the plastic base and hence the clear lens in terms of 2 mm thickness is preferably, but is not particularly limited to, 94.5 to 99.9%.

The average transmittance of the plastic base in the wavelength region of 530 nm to 570 nm is preferably, but is not particularly limited to, 94.5 to 99.9%.

The average transmittance of the plastic base in the wavelength region of 430 nm to 470 nm is preferably, but is not particularly limited to, 94.5 to 99.9%.

The average transmittance of the plastic base in the wavelength region of 630 nm to 670 nm is preferably, but is not particularly limited to, 97.0 to 99.9%.

According to the embodiment of the invention, the dyeing solution that may be used to dye the plastic base preferably contains a dye, a surfactant and a solvent such as water. Further, the dyeing solution may contain one type of dye, i.e., one color of dye but may be a mixed dyeing solution containing two or more types of dyes, i.e., two or more colors of dyes.

In other words, in dyeing of the plastic base according to the embodiment of the invention, a plurality of dyeing solutions, i.e., a plurality of dyeing solutions having different colors from each other may be individually used in dyeing. However, a mixed dyeing solution obtained by formulating two or more colors of dyes before dyeing may be used.

It is preferred to use a mixed dyeing solution obtained by formulating all colors of dyes according to desired spectral characteristics. It is preferred to prepare, for example, a mixed dyeing solution in which dyes of red, blue and yellow, and further brown or other colors are formulated in advance.

The mixed dyeing solution may be prepared by mixing a plurality of dyeing solutions of different colors or may be prepared from a plurality of dyes formulated in advance.

Dyes for use in the embodiment of the invention are not particularly limited as long as they have predetermined colors. Any dye may be used insofar as the exemplary dyed lens of the invention which is obtained by dyeing with the use of a plurality of dyeing solutions prepared from dyes of a plurality of colors or a mixed dyeing solution prepared by formulating dyes of a plurality of colors has the dyeing density and the average transmittance differences in the predetermined wavelength ranges falling within the limited ranges according to the invention.

In other words, according to the embodiment of the invention, examples of the dye to be contained in the dyeing solution include a disperse dye, a reactive dye, a direct dye, a composite dye, an acid dye, a metal complex dye, a vat dye, a sulfur dye, an azo dye, a fluorescent dye, a resin coloring dye, and other functional dyes. In addition to these, any dye may be used without particular limitation. These dyes may be used singly or as a mixture of two or more.

The color is also not particularly limited and, for example, a yellow (Y) dye, a red (R) dye, a blue (B) dye, a brown dye, a violet dye, an orange dye, a black dye and the like can be used. Any color may be selected without particular limitation. For example, three color dyes including a yellow (Y) dye, a red (R) dye, and a blue (B) dye are commonly used as disperse dyes for polyesters.

A dye that may be used in the embodiment of the invention is a dye generally called a disperse dye, which is poorly soluble in water and is widely used in dyeing of optical plastic lenses as a suspension containing the dye dispersed in a solvent such as water.

To be more specific, as dyes for use in the embodiment of the invention, for example, disperse dyes such as an anthraquinone dye, a quinophthalone dye, nitrodiphenylamine dye, and an azo dye can be used Examples of the disperse dyes include p-anisidine, aniline, p-aminoacetanilide, p-aminophenol, 1-chloro-2,4-dinitrobenzene, 2-chloro-4-nitroaniline, o-chloronitrobenzene, diphenylamine, m-nitroaniline, p-nitroaniline, N,N-bis(2-hydroxyethyl)aniline, 1-phenyl-3-methyl-5-pyrazolone, and benzene intermediates such as phenol; p-cresidine (6-methoxy-n-toluidine), m-cresol, p-cresol, m-toluidine, 2-nitro-p-toluidine, and toluene intermediates such as p-nitrotoluene; 1-naphthylamine and naphthalene intermediates such as 2-naphthol; and 1-amino-4-bromoanthraquinone-2-sulfonic acid (bromamine acid), 1-anthraquinonesulfonic acid, 1,4-diaminoanthraquinone, 1,5-dichloroanthraquinone, 1,4-dihydroxyanthraquinone (quinizarin), 1,5-dihydroxyanthraquinone (anthrarufin), 1,2,4-trihydroxyanthraquinone (purpurin), 2-methylanthraquinone and anthraquinone intermediates such as phthalic anhydridee. These may be used singly or as a mixture of two or more.

The yellow dye is not particularly limited but various known yellow dyes can he used and examples thereof include Kayalon Polyester Yellow AL, Kayalon Microester Yellow AQ-LE, Kayalon Microester Yellow C-LS, Kayalon Microester Yellow 5L-E, Kayalon Polyester Yellow 5R-SE (N)200, and Kayalon. Polyester Yellow BRL-S 200 (manufactured by Nippon Kavaku Co., Ltd.), Kiwalon Polyester Yellow ESP coo, and Kiwalon Polyester Yellow KN-SE 200 (manufactured by Kiwa Chemical industry Co., Ltd.), FSP-Yellow P-E (manufactured by Futaba Sangyo Co., Ltd.), and Dianix Yellow (manufactured by DyStar Japan Ltd.).

The red dye is not particularly limited but various known red dyes can be used and examples thereof include Kayalon Microester Red AUL-S, Kayalon. Microester Red 5L-E, Kayalon Microester Red C-LS conc, Kayalon Microester Red DX-LS, Kayalon polyester Red AN-SE, Kayalon Polyester Red B-LE, and Kayalon Polyester Rubine GL-SE 200 (manufactured by Nippon Kayaku Co., Ltd.), Kiwalon Polyester Red ESP and Kiwalon Polyester Red KN-SE (manufactured by Kiwa Chemical Industry CO., Ltd.), FSP-Red BL (manufactured by Futaba Sangyo Co., Ltd.), and Dianix Red (manufactured by DyStar Japan Ltd.).

The blue dye is not particularly limited but various known blue dyes can be used and examples thereof include Kavalon Polyester Blue AUL-S dye (manufactured by Nippon Kayaku Co., Ltd.), Dianix Blue AC-E (manufactured by DyStar Japan Ltd.), Kiwalon Polyester Blue ESP and Kiwalon Polyester Blue KN-SE (manufactured by Kiwa Chemical Industry Co., Ltd.), Kayalon Microester Blue AQ-LE, Kayalon Microester Blue 5L-E, Kayalon Microester Blue C-LS conc, Kayalon Microester Blue DX-LS cone, Kayalon Polyester Blue AN-SE, and Kayalon Polyester Blue AUL-S(N) (manufactured by Nippon Kayaku Co., Ltd.), and FSP-Blue AUL-S (manufactured by Futaba Sangyo Co., Ltd.).

The surfactant that may be used in the embodiment of the invention is not particularly limited but any surfactant may be used particularly if the above-described dyes can be uniformly dispersed in a solvent such as water. Examples of the surfactant include anionic surfactants such as an alkylbenzene sulfonate, an alkyl naphthalene sulfonate, an alkyl sulfosuccinate, an aromatic sulfonic acid-formalin condensate, and a lauryl sulfate; and nonionic surfactants such as a polyoxyethyl alkyl ether, an alkylamine ether, and a polyoxyethylene sorbitan fatty acid ester, and combinations of these surfactants. Among these surfactants, anionic surfactants are suitable. An exemplary commercial product that is industrially readily available includes Nicca Sunsolt #7000 (trade name; manufactured by Nicca Chemical Co., Ltd.).

According to the embodiment of the invention, the solvent that may be contained in the dyeing solution is not particularly limited as long as the dye can be sufficiently dissolved therein. Examples of the solvent include water, methanol, ethanol, methyl ethyl ketone, ethylene glycol monoethyl ether, acetone, isopropyl alcohol, isobutyl alcohol, ethyl ether, chlorobenzene, isobutyl acetate, isopropyl acetate, isopentyl acetate, ethyl acetate, butyl acetate, pentyl acetate, methyl acetate, cyclohexanol, 1,4-dioxane, N,N-dimethylformamide, tetrahydrofuran, 1,1,1-trichloroethane (methyl chloroform), toluene, 1-butanol, 2-butanol, methyl isobutyl ketone, methylcyclohexanone, methyl butyl ketone, acetophenone, benzoic acid ester, and methylcyclohexane. These solvents may be used singly or as a mixture of two or more.

According to the embodiment of the invention, it is possible to add a carrier agent serving as a dyeing accelerator when necessary. Illustrative examples of the carrier agent include aromatic ring-containing alcohols such as benzyl alcohol, phenethyl alcohol and dimethyl benzyl carbinol; o-phenylphenol, p-phenylphenol, trichlorobenzene, dichlorobenzene, and methylnaphthalene.

In addition, the dyeing solution may optionally contain various additives such as a ph adjuster, a viscosity modifier, a leveling agent, a matting agent, a stabilizer, a UV absorber, and an antioxidant.

The amount of the dye contained in the dyeing solution is not particularly limited as long as the dye can be sufficiently dissolved in a solvent. For example, the dye content is preferably 0.001 wt % to 10 wt % and more preferably 0.01 wt % to 5 wt %. in a case where the dye content in the dyeing solution is below the foregoing range, there is a possibility that a satisfactory dyed lens may not be easily obtained. In a case where the dye content is above the foregoing range, there is a possibility that agglomeration may occur depending on the dye to make it difficult to use the dye.

The amount of the surfactant contained in the dyeing solution is not particularly limited as long as the dye can be uniformly dispersed in a solvent. For example, the surfactant content is preferably 0.01 wt % to 10 wt % and more preferably 0.05 wt % to 5 wt %. In a case where the surfactant content in the dyeing solution is below the foregoing range, there is a possibility that the dye may not be sufficiently dispersed to cause the dyed lens to be unevenly colored. In a case where the surfactant content is above the foregoing range, there is a possibility that bubbles may be formed in the dyeing solution to reduce the workability or to deteriorate the dyeing properties of the plastic base.

There are two methods to be described below as methods of obtaining a dyed lens by dyeing at least one surface of a plastic base.

(1) Method which includes coating a surface of a plastic base (lens) with a dyeing solution and heating to dye the surface of the lens with the dyeing solution (coating method); and (2) method which includes dipping a plastic base (lens) in a heated dyeing solution to dye a surface of the lens (dipping method).

Of these two methods, the coating method in (1) above is preferred in terms of reduced production cost but the dipping method in (2) above is preferred in terms of ease of uniform coating. Therefore, a suitable method should be selected depending on the intended purpose.

In a case where a plurality of dyeing solutions are used to obtain the exemplary dyed lens according to the invention, dyeing with the plurality of dyeing solutions is preferably performed by the coating method in (1) above or the dipping method in (2) above but both methods may be used in combination.

Common coating processes such as brush coating, dip coating, spin coating, roll coating, spray coating, flow coating, and inkjet coating can be used as processes of coating the plastic base with the dyeing solution in the above-described coating method. As for the surface to be coated, one surface of the plastic base (lens) may be coated or both surfaces thereof may be coated to further increase the dyeing density. The plastic base may be coated with the dyeing solution to any thickness without particular limitation. The thickness can be appropriately adjusted and be set to a range of, for example, 0.01 μm to 10 μm.

In a case where the whole surface of the plastic base (lens base) is subjected to dyeing (coloring processing) at a uniform dyeing density in dyeing using the coating method, the dye in the dyeing solution is preferably made to penetrate through the lens surface to be diffused by performing heating treatment after the lens surface is coated with the dyeing solution. As for the heating conditions of the plastic base (lens) coated with the dyeing solution, the heating temperature is preferably 70° C. to 180° C. and the heating time is preferably 10 to 180 minutes. In addition to heating in an air oven, heating methods such as heating by exposure to far infrared radiation and heating by exposure to UV radiation can also be used.

In a case where the plastic base (lens base) is subjected to dyeing (coloring processing) having a gentle density gradient in dyeing using the coating method, the dye can be made to penetrate into the inside of the lens base in an amount corresponding to the density gradient by coating the lens with the dyeing solution and then heating the surface coated with the solution (dyeing solution surface) so that the region under heating gradually changes.

The exemplary dyed lens according to the invention can be obtained by coating the plastic base (lens base) with the dyeing solution, heating the plastic base (lens base) coated with the dyeing solution, and then cleaning the lens base to remove the coating layer (applied dyeing solution) on the surface of the lens base, or alternatively by repeating these treatments when a plurality of dyeing solutions are individually used. Methods of cleaning the lens base after the heating treatment are not particularly limited as long as the coating layer (applied dyeing solution) on the surface of the lens base can be removed, and wiping it off with an organic solvent or cleaning with an alkali cleaner is preferred. Among others, it is further preferred to wipe it off using acetone or methyl ethyl ketone as an organic solvent.

In a case where the plastic base (lens base) is dyed by the above-described dipping method, the dyed lens can be obtained by dipping the lens base in the dyeing solution so that the dye in the dyeing solution penetrates through the lens base surface to be diffused in the lens base, or alternatively by repeating these treatments when a plurality of dyeing solutions are individually used. The order in which the lens base is dipped is not particularly limited when a plurality of dyeing solutions are used.

In dyeing using the dipping method, the lens base is preferably dipped in a dyeing solution heated to 80° C. to 95° C.

The lens base after the end of the dipping is cleaned by, for example, washing with water or wiping with a solvent to remove the dyeing solution adhering to the lens outer surface, whereby the exemplary dyed lens according to the invention can be obtained. The dyeing solution adhering to the lens outer surface is preferably removed by cleaning each time the dyeing solution is changed.

The dye penetrates through the surface of the plastic base (lens base) to be diffused inside the lens base to obtain the exemplary dyed lens according to the invention which is dyed to have a desired color (dyeing density).

The dyed lens which is dyed with the dyeing solution in this way preferably has a hard coating film and an antireflective film formed thereon.

The hard coating film is not particularly limited but a conventionally known hard coating film can be used. Examples of the hard coating film include a urethane coating film for improving the impact resistance and a silicon hard coating film for improving the abrasion resistance.

For example, a film formed of a silicon hard coating composition can be applied as such a hard coating film. Particularly, a film formed of a silicon hard coating composition containing (A) metal oxide particles, (B) an organic silicon compound or its hydrolysate, and (C) a curing catalyst can be suitably used.

Specific examples of the metal oxide particles (A) include fine particles of metal oxides such as iron oxide, zinc oxide, aluminum oxide, titanium oxide, zirconium oxide, tin oxide, beryllium oxide, antimony oxide, tungsten oxide and cerium oxide. These may be used singly or as a mixture of two or more. Composite metal oxide fine particles formed of two or more metal oxides selected from these metal oxides may also be used.

As these metal oxide fine particles or composite metal oxide fine particles, fine particles having a particle size of 1 to 100 nm are preferably used, and fine particles which solvate when dispersed in water, methanol or other organic solvents are preferably used.

As the organic silicon compound or its hydrolysate (B), a compound represented by formula (2) shown below can be used.

$$R^1_a R^2_b Si(OR^3)_{4-(a+b)} \qquad (2)$$

(In formula (2) shown above, $R^1$ is an organic group having a functional group or an organic group having an unsaturated double bond and containing 4 to 14 carbon atoms, $R^2$ is a hydrocarbon group or halogenated hydrocarbon group containing 1 to 6 carbon atoms, $R^3$ is an alkyl group, alkoxyalkyl group or acyl group containing 1 to 4 carbon atoms, a and b are each 0 or 1, and a+b is 1 or 2.)

Specific examples of the organic silicon compound represented by formula (2) shown above include γ-glycidoxypropyltrimethoxysilane, γ-glycidoxypropyitriethoxysilane, γ-glycidoxypropyitriacetoxysilane, γ-glycidoxypropylmethyldimethoxysilane,γ-glycidoxvpropylmethyldiethoxysilane, and β-(3,4-epoxycyclohexyl)ethyltriethoxysilane.

Exemplary organic silicon compounds represented by formula (2) shown above except organic silicon compounds in which $R^1$ has epoxy group as a functional group (including cases where a=0) include various trialkoxysilanes, triaoyloxysilanes and trialkoxyalkoxysilanes, as exemplified by methyltrimethoxysilane, methyltriethoxysilane, vinyltrimethoxysilane, vinyltriethoxysilane, vinyltriacetoxysilane, vinyitrimethoxyethoxysilane, γ-methacryloxypropyltrimethoxysilane, aminomethyltrimethoxysilane, 3-aminopropyltrimethoxysilane, 3-aminopropyltriethoxysilane, phenyltrimethoxysilane, phenyltriethoxysilane, γ-chloropropyltrimethoxysilane, γ-mercaptopropyltriethoxysilane, and 3,3,3-trifluoropropyltrimethoxysilane.

Examples of the curing catalyst (C) include metal alkoxides, organic metal salts, tin compounds, amines (see JP 2004-315556 A), phosphines, quaternary ammonium salts, Quaternary phosphonium salts, tertiary sulfonium salts, secondary iodonium salts, mineral acids, Lewis acids, organic acids or anhydrides thereof, silicates, tetrafluoroboric acids, peroxides, azo compounds, aldehyde-ammonia compound condensates, guanidines, thiouric acids, thiazoles, sulfenamides, thiurams, dithlocarbamates, xanthates, and acidic phosphate esters. Among these, quaternary ammonium salts are preferred and triethylbenzylammonium chloride is more preferred. These curing catalysts may be used singly or in combination of two or more.

Specific examples of the curing catalyst (C) include amines such as monoethanolamine, diethanolamine, isopropanolamine, ethylenediamine, isopropylamine, diisopropylamine, morpholine, triethanolamine, diaminopopane, aminoethylethanolamine, dicyandiamide, triethylenediamine, and 2-ethyl-4-methylimidazole. Various metal complex compounds include acetylacetonate metal complex compounds and ethylenediaminetetraacetic acid chelate metal complex compounds which contain Li, Zn, Mn, Mg, Fe, Cu, Co, Ca, Bi, Al, Ni, Cr, Zr and V as center metals. Specific examples thereof include aluminum acetylacetonate, aluminum bisethylacetoacetate, monoacetyl acetonate, aluminum-di-n-butoxide-monoethil acetoacetate, aluminum-di-iso-propoxide-monomethyl acetoacetate, chromium acetylacetonate, titanyl acetylacetonate, cobalt acetylacetonate, iron (III) acetylacetonate, manganese acetylacetonate, nickel acetylacetonate, indium acetylacetonate, iron ethylenediaminetetraacetate, aluminum ethylenediaminetetraacetate, zinc ethylenediaminetetraacetate, manganese ethylenediaminetetraacetate, magnesium ethylenediaminetetraacetate, copper ethylenediaminetetraacetate, cobalt ethylenediaminetetraacetate, calcium ethylenediaminetetraacetate, and bismuth ethylenediaminetetraacetate.

These metal complex compounds may be used singly or as a mixture of two or more. Further, examples of the metal alkoxides include aluminum triethoxide, aluminum tri-n-propoxide, aluminum tri-n-butoxide, tetraethoxy titanium, tetra-n-butoxy titanium, and tetra-i-propoxy titanium.

Examples of the organic metal salts include sodium acetate, zinc naphthenate, cobalt naphthenate, and tin octylate. Exemplary perchlorates include magnesium perchlorate and ammonium perchlorate.

Further, examples of the organic acids or anhydrides thereof include malonic acid, succinic acid, tartaric acid, adipic acid, azelaic acid, maleic acid, o-phthalic acid, terephthalic acid, fumaric acid, itaconic acid, oxaloacetic acid, maleic anhydride, succinic anhydride, itaconic anhydride, 1,2-dimethylmaleic anhydride, bhthalic anhydride, hexahydrophthalic anhydride, and naphthalic anhydride.

Examples of the Lewis acids include ferric chloride and aluminum chloride. Examples of the halogenated metals include stannous chloride, stannic chloride, tin bromide, zinc chloride, zinc bromide, titanium bromide, titanium tetrachloride, thallium bromide, germanium chloride, hafnium chloride, lead chloride, and lead bromide.

The above-described curing cataaysts may be used singly or as a mixture of two or more depending on the intended purpose. In a case where a silane compound containing epoxy group is used as the ingredient (B) in addition, to these curing catalysts, a compound which also serves to perform ring-opening polymerization of the epoxy group may also be used. For example, an aluminum chelate compound is one of preferred catalysts.

When forming the hard coating film, a coating solution of the hard coating composition including the above-described ingredients (A) to (C) is applied to a surface of a plastic lens by, for example, methods such as a dipping method, a spraying method and a spin coating method. The applied hard coating composition is subjected to thermal curing to form a coating film. The coating film preferably has a curing temperature in a range of 70 to 140° C. and more preferably 90 to 120° C. The coating film preferably has a thickness in a range of 1.0 to 10.0 μm and more preferably 1.5 to 4.0 μm.

When forming the hard coating film, a solvent may be added in addition to the above-described ingredients (A) to (C) to adjust the solid content in the coating solution. Examples of the solvent include water, lower alcohols, acetone, ethers, ketones and esters.

In addition to these, various additives may be used in combination. Exemplary additives include a pH adjuster, a viscosity modifier, a leveling agent, a matting agent, a dyne, a pigment, a stabilizer, a UV absorber, and an antioxidant.

A single-layered or multi-layered antireflective film formed of an inorganic oxide such as $SiO_2$ or $TiO_2$ may he further formed on the hard coating layer when necessary. The antireflective film layer is preferably a multi-layered antireflective film, and in this case, one or more lower refractive index films and one or more higher refractive index films are formed alternately. Exemplary higher refractive index films include films of ZnO, $TiO_2$, $CeO_2$, $Sb_2O_5$, $SnO_2$, $ZrO_2$ and $Ta_2O_5$, and an exemplary lower refractive index film includes a $SiO_2$ film. Exemplary methods of forming the antireflective film layer include dry methods such as vacuum deposition, sputtering, ion plating, ion beam assisted deposition and CVD.

It is possible to form an anti-fog coating film layer or a stain-proof film layer on the antireflective film layer when necessary.

As described above, the exemplary dyed lens according to the invention is obtained by dyeing a clear lens with a predetermined dyeing solution so as to have a predetermined difference in spectral transmittance from the clear lens, and hence the difference in average transmittance from the clear lens in the medium wavelength region of 530 nm to 570 nm is adjusted to fall within a predetermined range to selectively cut light in the medium wavelength region, and the dyeing density (difference in luminous transmittance over the visible wavelength region) is also adjusted to fall within a predetermined range to slightly cut light in a large part of the visible wavelength region.

As described in the conventional technique using FIG. 7, the luminous efficiency (luminous efficacy) per se of human eyes is low in a bright place and the sensitivity peak is at around 555 nm. However, in the gloom for lack of light, the luminous efficiency increases to be higher and the sensitivity peak shifts and deviates to the short wavelength side. Therefore, Purkinje phenomenon occurs in which, even if human eyes perceive red and blue at the same brightness in a bright place, red is perceived to be dustier and darker in a gloomy place.

Therefore, the effect that objects can be seen brightly and vividly even in a gloomy place can be obtained by using the exemplary dyed lens of the invention that is a thin red lens for spectacles which selectively cuts light in the medium wavelength region of 530 nm to 570 nm while also slightly cutting light in a large part of the visible wavelength region.

Figure 2:
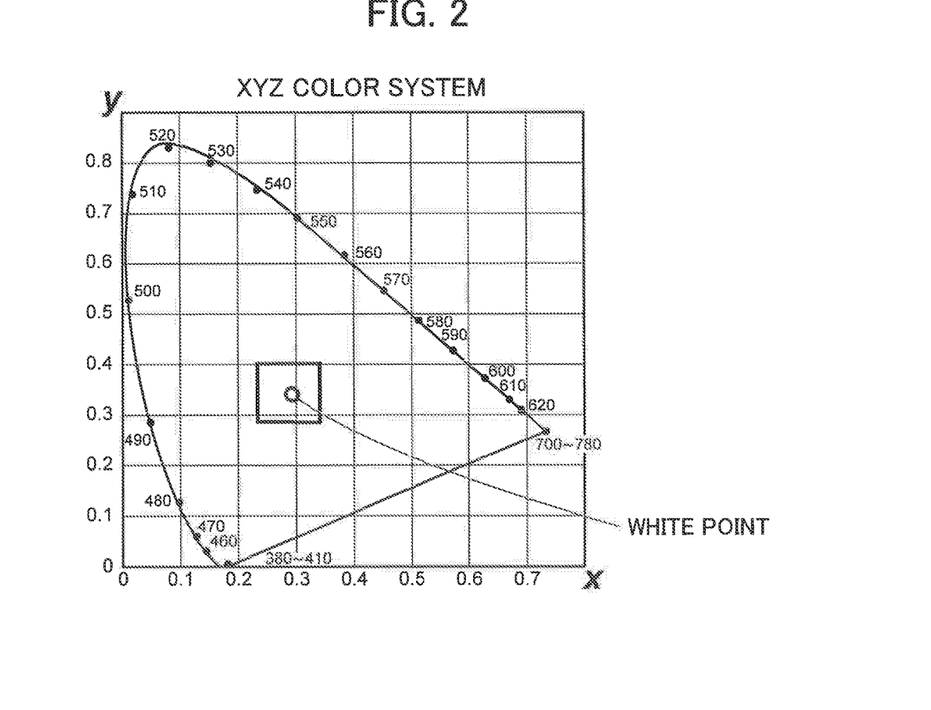
FIG. 2 is an illustration diagram illustrating a white point on the xy coordinates in the XYZ color system.

The inventors of the invention measured the luminance of white screens of a PC (personal computer: LED backlight) and a PDA (Personal Digital Assitant) such as iPad (registered trademark) using a luminance meter, and as a result found that, the luminance is distributed in YL and GR directions from a white point defined in the XYZ color system illustrated in FIG. 2 (white point: indicated by circles in FIG. 3 and FIG. 4 as indicated by rhombic points (no lens) in FIG. 3 and FIG. 4. A rectangular region surrounding the white point in FIG. 2 is only shown in enlarged view in FIG. 3 and FIG. 4.

Figure 3:
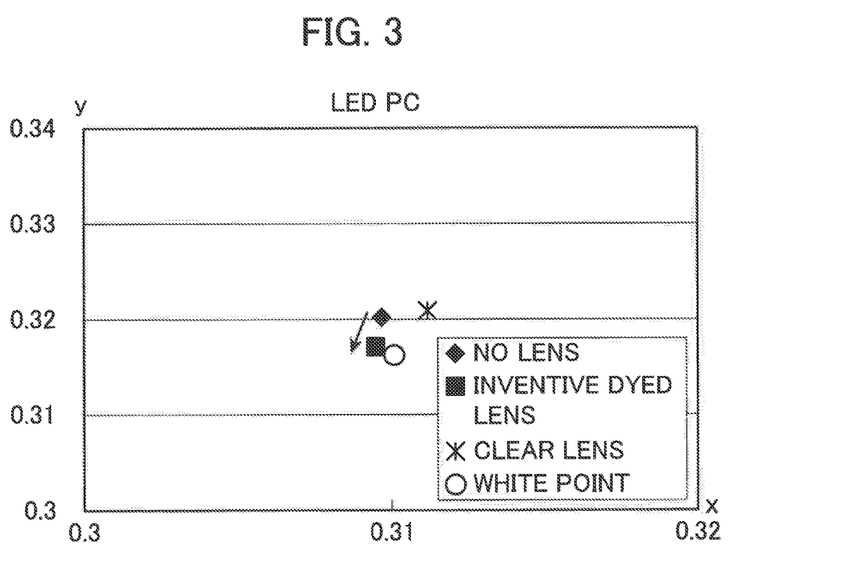
FIG. 3 is an illustration diagram illustrating an effect of the functional dyed lens for spectacles according to an embodiment of the invention.
Figure 4:
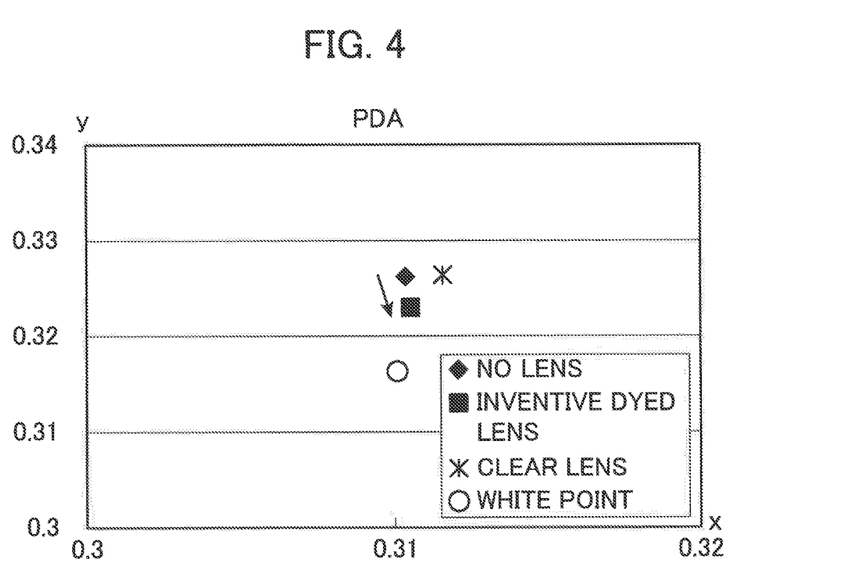
FIG. 4 is an illustration diagram illustrating an effect of the functional dyed lens for spectacles according to an embodiment of the invention.

Then, the inventors of the invention confirmed that even when the clear lens that is an undyed plastic lens is used, the luminance of the white screens of the PC and PDA illustrated in FIG. 3 and FIG. 4 which deviates from the white point in the XYZ color system does not approach the white point but only moves to asterisks (clear lens) in FIG. 3 and FIG. 4, whereas when the thin red dyed lens according to the embodiment of the invention is used the luminance moves to longitudinal points (inventive dyed lens) and approaches the white points in FIG. 3 and FIG. 4.

In other words, according to the embodiment of the invention, as a synergistic effect of selective cutting of light in the medium wavelength region of 530 nm to 570 nm and slight cutting of light in a large part of the visible wavelength region, white screens of a PC (in particular an LED backlight) and a PDA such as iPad (registered trademark) are perceived to be whiter. Therefore, the effect of making operations on a personal computer more comfortable can be obtained.

EXAMPLES

The present invention is described below more specifically by way of examples. However, the present invention should not be construed as being limited to the following examples.

Example 1

(Preparation of Dyeing Solutions)

First, each dyeing solution was prepared as described below from a dye, a surfactant and pure water.

Pure water (1,000 parts by weight) was placed in a container and Kayalon Polyester Yellow AL dye (manufactured by Nippon Kayaku Co., Ltd.; 2.0 parts by weight) serving as a yellow dye and Nicca Sunsolt #7000 (trade name; manufactured by Nicca Chemical Co., Ltd.; 1.0 part by weight) were added to obtain a dyeing solution 1. Pure water (1,000 parts by weight) was placed in a container and Kayalon Polyester Blue AUL-S dye (manufactured by Nippon Kayaku Co., Ltd.; 2.0 parts by weight) serving as a blue dye and Nicca. Sunsolt #7000 (1.0 part by weight) were added to obtain a dyeing solution 2. Pure water (1,000 parts by weight) was placed in a container and Kayalon Polyester Red AUL-S dye (2.0 parts by weight) serving as a red dye and Nicca Sunsolt #7000 (1.0 part by weight) were added to obtain a dyeing solution 3.

(Dyeing of Plastic Lens and Preparation of Dyed Lens)

Next, the prepared three dyeing solutions 1, 2 and 3 were each heated to 90° C., and a plastic lens (Nikon Lite 4AS manufactured by Nikon-Essilor Co., Ltd.; diameter: 80 mm; center thickness: 2 mm) having a refractive index of 1.67 was dipped in each of the dyeing solutions 1, 2, and 3.

Next, a surface of the resulting dyed lens was coated with hard coating films such as a urethane coating film for improving the impact resistance with a thickness of about 1 μm and a silicon hard coating film for improving the abrasion resistance with a thickness of about 2 μm, which were then further coated by vacuum deposition with an antireflective film such as a multi-layered antireflective coating film having a thickness of about 0.3 μm and formed of an inorganic oxide, thereby obtaining an objective dyed lens.

(Wearing Evaluation of Dyed Lens)

The plastic dyed lens was put into a frame and a spectacle lens wearing test was conducted with the aid of subjects in their 40 s to 60 s to perform a sensory evaluation.

The spectral transmittance of the plastic dyed lens and undyed clear lens was measured to determine the dyeing density of the plastic dyed lens and the average transmittance in each of a wavelength region of 530 nm to 570 nm, a wavelength region of 430 nm to 470 nm, and a wavelength region of 630 nm to 670 nm.

The sensory evaluation in the plastic dyed lens wearing test conducted with the aid of subjects was performed according to the following criteria. In the sensory evaluation, ordinary people in their 40 s to 60 s were selected as the subjects and the subjects were made to use the exemplary dyed lens of the invention in the form of a blind test to prevent them from having preconceptions and the effect was examined by a questionnaire survey.

As for the white point (whitening), the subjects were asked a question as to whether or not they perceived a white screen on a personal computer (in particular during an operation using an Excel file) to be whiter.

As for color brightness (brightening), the subjects were made to use the dyed lens in a room and in a gloomy outdoor place from evening to night and asked a question as to whether or not they felt brightness as compared to the undyed clear lens.

A case where the effect that a landscape and an object were seen vividly and brightly, particularly in red color, in a gloomy environment, and a white screen on a personal computer was perceived to be whiter was obtained obviously unlike the undyed clear lens was rated as good, and a case where red was perceived to he dusty or there was no difference from the clear lens on perception of white of the white screen on the personal computer was rated as poor.

The plastic dyed lens in Example 1 was rated as good.

The clear lens had a luminous transmittance of 96.6%, The clear lens had average transmittances of 96.1%, 96.8% and 98.5% in wavelength regions of 530 nm to 570 nm, 430 nm to 470 nm, and 630 nm to 670 nm, respectively.

These results are shown in Table 1.

Example 2

A plastic lens (Nikon Lite 4AS) having a refractive index of 1.67 was dipped in each of the same three dyeing solutions 1, 2 and 3 as in Example 1. On the resulting dyed lens were formed the same hard coating film and antireflective film as in Example 1 to obtain an objective dyed lens. The plastic dyed lens was put into a frame and the same wearing test as in Example 1 was conducted with the aid of the subjects in their 40 s to 60 s to perform a sensory evaluation. The spectral characteristics of the plastic dyed lens were measured.

According to the sensory evaluation results of the plastic dyed lens wearing test, a rating of good was obtained as in Example 1.

The plastic lens had a dyeing density of 3.6%.

These results are shown in Table. 1.

Comparative Example 1

A plastic lens (Nikon Lite 4AS) having a refractive index of 1.67 was dipped in each of the same three dyeing solutions 1, 2 and 3 as in Example 1. On the resulting dyed lens were formed the same hard coating film and antireflective film as in Example 1 to obtain an objective dyed lens. The plastic dyed lens was put into a frame and the same wearing test as in Example 1 was conducted with the aid of the subjects in their 40 s to 60 s to perform a sensory evaluation. The spectral characteristics of the plastic dyed lens were measured.

According to the sensory evaluation results of the plastic dyed lens wearing test, the effect as described in Example 1 could not be felt and the plastic dyed lens was rated as poor unlike in Example 1.

The plastic lens had a dyeing density of 1.4%.

These results are shown in Table 1.

Comparative Example2

A plastic lens (Nikon Lite 4AS) having a refractive index of 1.67 was dipped in each of the same three dyeing solutions 1, 2 and 3 as in Example 1. On the resulting dyed lens were formed the same hard coating film and antireflective film as in Example 1 to obtain an objective dyed lens. The plastic dyed lens was put into a frame and the same wearing test as in Example 1 was conducted with the aid of the subjects in their 40 s to 60 s to perform a sensory evaluation. The spectral characteristics of the plastic dyed lens were measured.

According to the results of the plastic dyed lens wearing test, the effect as described in Example 1 could not be felt and the plastic dyed lens was rated as poor unlike in Example 1.

The plastic lens had a dyeing density of 4.4%. These results are shown in Table 1.

Comparative Example 3

A plastic lens (Nikon kite 4AS) having a refractive index of 1.67 was dipped in each of the same three dyeing solutions 1, 2 and 3 as in Example 1. On the resulting dyed lens were formed the same hard coating film and antireflective film as in Example 1 to obtain an objective dyed lens. The plastic dyed lens was put into a frame and the same wearing test as in Example 1 was conducted with the aid of the subjects in their 40 s to 60 s to perform a sensory evaluation. The spectral characteristics of the plastic dyed lens were measured.

According to the sensory evaluation results of the plastic dyed lens wearing test, the effect as described in Example 1 could not be felt and the plastic dyed lens was rated as poor unlike in Example 1.

The plastic lens had a dyeing density of 2.4%.

These results are shown in Table 1.

Comparative Example 4

A plastic lens (Nikon kite 4AS) having a refractive index of 1.67 was dipped in each of the same three dyeing solutions 1, 2 and. 3 as in Example 1. On the resulting dyed lens were formed the same hard coating film and antireflective film as in Example 1 to obtain an objective dyed lens. The plastic dyed lens, was put into a frame and the same wearing test as in Example 1 was conducted with the aid of the subjects in their 40 s to 60 s to perform a sensory evaluation. The spectral characteristics of the plastic dyed lens were measured.

According to the sensory evaluation results of the plastic dyed lens wearing test, the effect as described in Example 1 could not be felt and the plastic dyed lens was rated as poor unlike in Example 1.

The plastic lens had a dyeing density of 0.4%, These results are shown in Table 1.

Comparative Example 5

A plastic lens (Nikon Lite 4AS) having a refractive index of 1.67 was dipped in each of the same three dyeing solutions 1, 2 and 3 as in Example 1. On the resulting dyed lens were formed the same hard coating film and antireflective film as in Example 1 to obtain an objective dyed lens. The plastic dyed lens was put into a frame and the same wearing test as in Example 1 was conducted with the aid of the subjects their 40 s to 60 s to perform a sensory evaluation. The spectral characteristics of the plastic dyed lens were measured.

According to the sensory evaluation results of the plastic dyed lens wearing test, the effect as described in Example 1 could not be felt and the plastic dyed lens was rated as poor unlike in Example 1.

The plastic lens had a dyeing density of 2.5%.

These results are shown in Table 1.

Results of Example 1 to Comparative Example 5 are compiled in Table 1.

TABLE 1

| | Rating | Difference in luminous transmittance τ Dyeing density (%) | Difference in average transmittance τ 530-570 nm (%) | Difference in average transmittance τ 430-470 nm (%) | Difference in average transmittance τ 630-670 nm (%) |
|---|---|---|---|---|---|
| Example 1 | Good | 2.7 | 3.3 | 1.2 | 1.2 |
| Example 2 | Good | 3.6 | 4.5 | 1.4 | 1.6 |
| Comparative Example 1 | Poor | 1.4 | 1.7 | 0.9 | 0.6 |
| Comparative Example 2 | Poor | 4.4 | 5.4 | 1.8 | 2.7 |
| Comparative Example 3 | Poor | 2.4 | 2.2 | 0.7 | 3.8 |
| Comparative Example 4 | Poor | 0.4 | 0.1 | 4.0 | 0.3 |
| Comparative Example 5 | Poor | 2.5 | 2.7 | 4.6 | 1.5 |

In Examples 1 and 2, the dyeing density which shows a difference in luminous transmittance τv from the clear lens and the difference in average transmittance τ at 530 to 570 nm fell within the limited ranges of the invention. The effect of improving the vividness and brightness of objects, and particularly red, perceived in a gloomy environment as well as the effect of improving perception of white on a white screen of a personal computer were seen and ratings of good were given.

In contrast, in Comparative Examples 1, 2 and 4, the dyeing density which shows the difference in luminous transmittance τv and the difference in average transmittance τ at 530 to 570 nm both fell outside the limited ranges of the invention. The effect of the invention could not be obtained and ratings of poor were In Comparative Examples 3 and 5, the dyeing density which shows the difference in luminous transmittance τv fell within the limited range of the invention but the difference in average transmittance τ at 530 to 570 nm fell outside the limited range of the invention. The effect of the invention could also not be obtained and ratings of poor were given.

From the above results, the effects of the invention are obvious.

The difference between the ratings of Examples 1 to 2 and those of Comparative Examples 1 to 5 is based on the dyed states of the dyed lenses with respect to those of the clear lenses, the dyed states being adjusted by the dipping time of the clear lenses in the dyeing solutions 1, 2 and 3. However, the dipping time for obtaining these dyed states considerably depends on the states of the dyeing solutions 2 and 3 and particularly their freshness, and hence it is difficult to specify the dyed states under the same conditions.

Therefore, the dipping time in each of Example 2 and Comparative Examples 1 to 5 was indicated by whether it is longer or shorter than that in. Example 1. The dipping time in the dyeing solutions 1, 2 and 3 in Example 2 was a little longer than that in. Example 1. The dip ping time in the dyeing solutions 1, 2 and 3 in. Comparative Example 1 was a little shorter than that in Example 1. The dipping time in the dyeing solutions 1, 2 and 3 in Comparative Example 2 was longer than that in Example 2. The dipping time in the dyeing solution 2 in Comparative Example 3 was longer than that in Example 1. The dipping time in the dyeing solution 3 in Comparative Example 3 was shorter than that in Example 1. The dipping time in the dyeing solution 1 in Comparative Example 4 was longer than that in Example 1. The dipping time in the dyeing solution 3 in Comparative Example 4 was shorter than that in Example 1, The dipping time in the dyeing solution 1 in Comparative Example 5 was longer than that in Example 1.

From the above, the embodiment of the present invention can clearly provide a functional dyed lens for spectacles which is suitable to the eyes of middle-aged and elderly people and which allows the middle-aged and elderly people wearing the spectacles to see objects brightly and vividly even in a gloomy place and particularly to perceive red brightly without losing its vividness, and also allows the middle-aged and elderly people to perceive white, for example, a white screen on a personal computer to be whiter, and as a result to more comfortably perform an operation on a personal computer or other operations in which their eyes are to be fixed on white.

What is claimed is:

1. A functional dyed lens for spectacles obtained by dyeing a lens base,
    wherein a dyeing density defined as a difference in luminous transmittance from an undyed plastic lens formed of the lens base is 2% or more but 4% or less,
    wherein a difference in average transmittance from the undyed plastic lens in a wavelength region of 530 nm to 570 nm is 3% or more but 5% or less,
    wherein the undyed plastic lens has a luminous transmittance in terms of 2 mm thickness of 94.5 to 99.9%, and
    wherein the undyed plastic lens has an average transmittance in terms of 2 mm thickness of 94.5 to 99.9% in the wavelength region of 530 nm to 570 nm.

2. The functional dyed lens for spectacles according to claim 1, wherein at least one surface of the lens base is dyed.

3. The functional dyed lens for spectacles according to claim 1, wherein the undyed plastic lens has an average transmittance in terms of 2 mm thickness of 94.5 to 99.9% in a wavelength region of 430 nm to 470 nm.

4. The functional dyed lens for spectacles according to claim 3, wherein a difference in average transmittance from the undyed plastic lens in a wavelength region of 430 nm to 470 nm is 2% or less.

5. The functional dyed lens for spectacles according to claim 1, wherein the undyed plastic lens has an average transmittance in terms of 2 mm thickness of 97.0 to 99.9% in a wavelength region of 630 nm to 670 nm.

6. The functional dyed lens for spectacles according to claim 5, wherein a difference in average transmittance from the undyed plastic lens in a wavelength region of 630 nm to 670 nm is 3.5% or less.

* * * * *